Oct. 17, 1933.  J. CAMPBELL  1,931,250
ELECTRIC WELDING APPLIANCE
Filed Feb. 10, 1930
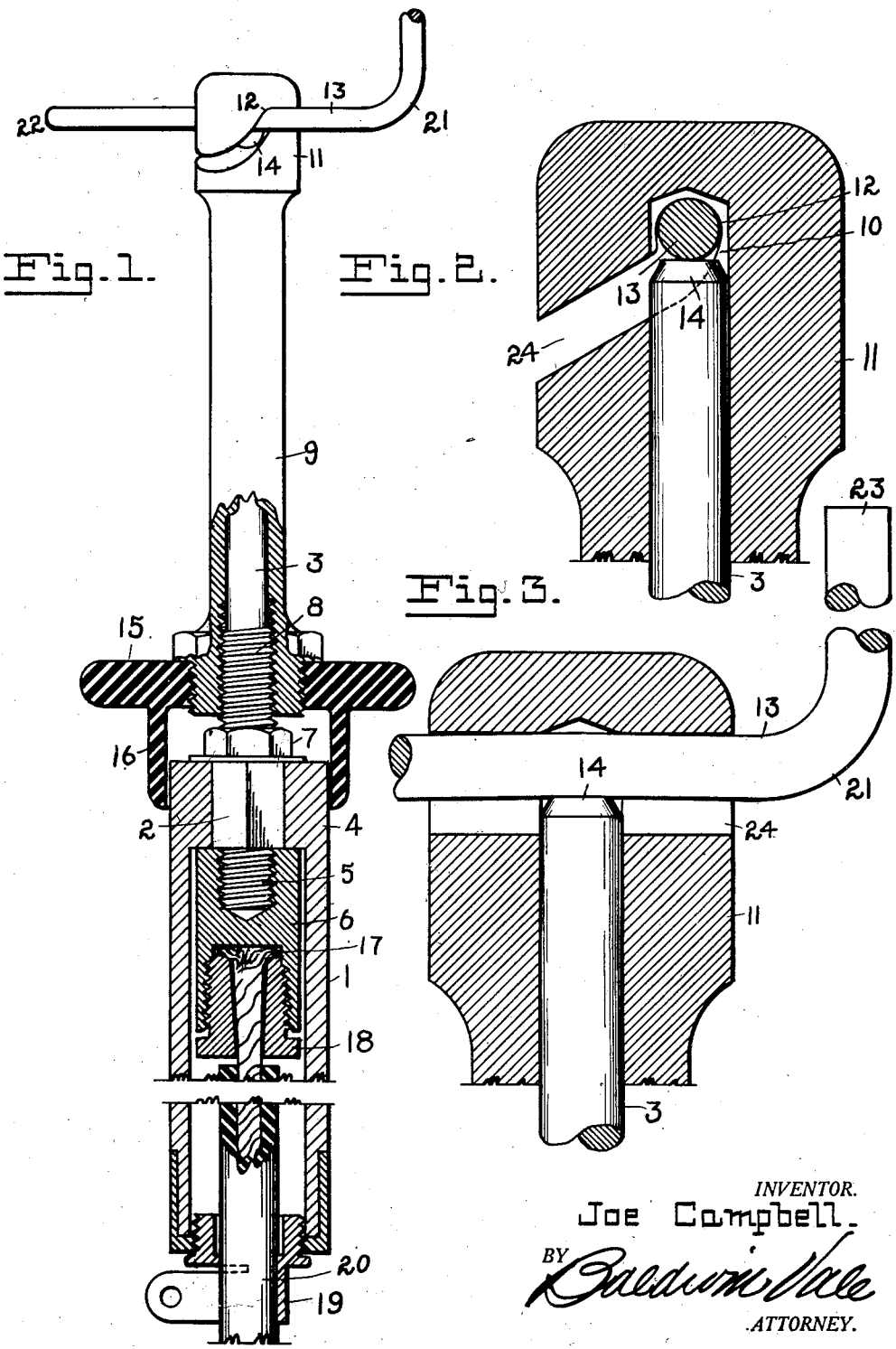
INVENTOR.
Joe Campbell.
BY
ATTORNEY.

Patented Oct. 17, 1933

1,931,250

UNITED STATES PATENT OFFICE 1,931,250

ELECTRIC WELDING APPLIANCE

Joe Campbell, Oakland, Calif., assignor of one-half to Joseph F. Boenner, Oakland, Calif.

Application February 10, 1930. Serial No. 427,211

1 Claim. (Cl. 219—8)

This invention relates to improvements in electric welding appliances, and more particularly to welding rod holders.

Among the objects of the invention are to securely hold welding rods against turning and slipping in the holder, and to facilitate the insertion and removal of the rods.

Another object is to reduce ohmic resistance within the holder to prevent the generation of needless heat therein.

A further object is to provide a compression electrical connection between the holder and the power cable that will withstand incidental longitudinal pulling without separating. Other objects and advantages will appear as the description progresses.

The general application of electric welding in the arts is comparatively recent. Heretofore welding rod holders have been more or less makeshifts, made up with small regard for speed of operation or convenience in applying the weld in places hard of access. In many of such holders the stub or waste ends of rod are difficult to remove from the holder, especially while hot.

Since the operation of electric welding involves the use of expensive machinery and skilled labor, it is important to maintain the maximum of working time in a given period of operation. Heretofore much time has been lost in changing rods in the holders and in repairing electrical connections between the holders and the power cables.

In the past it has been the practice to solder the cable end into the holder. Due to the heat incidental to the ohmic resistance of the holder and the heat conducted from the welding rod to the holder, these soldered connections melt out if the welding operation is continued for a considerable period.

In this specification and the accompanying drawing the invention is disclosed in its preferred form. But it is to be understood that it is not limited to this form because it may be embodied in other forms. It is also to be understood that in and by the claim following the description it is desired to cover the invention in whatsoever form it may be embodied.

In the one sheet of drawing:

Fig. 1 is an elevation, partly in longitudinal section, of a welding rod holder constructed in accordance with this invention.

Fig. 2 is an enlarged detail of the rod holding chuck in longitudinal section transverse to the axis of the rod.

Fig. 3 is a similar view parallel with the axis of the rod.

In detail the construction illustrated in the drawing, referring to Fig. 1, comprises the hollow handle 1. The square portion 2 of the conductor 3, snugly engages a square hold in the head 4 of the handle. The conductor end is threaded at 5, and screwed into the end of the compression connector 6. The diameter of the connector is greater than that of the hole in the head 4, against which it is pulled tight by the jam nut 7 threaded on the running thread 8 on the conductor 3. The conductor and the handle are thus rigidly assembled and turn as one piece.

The threads 8 engage the internally threaded neck 9 which is bored to pass the conductor 3. This bore 10 extends into the clutch head 11 on the end of the neck 9.

The clutch has a transverse hole 12 therethrough, bisecting the hole 10, to hold the welding rod 13. This hole 12 is spaced backward from the end of the hole 10. The end 14 of the conductor engages the rod 13 and firmly clamps the same in the chuck head when the handle 1 is turned to advance the conductor into the neck 9 by the threads 8.

The neck 9 is threaded into the dielectric flange 15, which has the integral guard 16 enclosing the end of the handle 1 and the nut 7. The guard 16 prevents the short circuiting of the conductor by a cross wire or the like which might otherwise drop between the flange 15 and the end of the handle 1.

Before the conductor assembly is installed in the handle 1, the end of the cable 17 is inserted through the bushing 18 and "mushroomed" and the bushing screwed into the end of the coupling 6, to compress the end of the cable into mechanical-electrical contact with the conductor 3, to transmit the welding current to the rod 13.

The split clamp 19 fixed in the end of the handle 1 is then pinched onto the insulated cable or cable armor 20, to transfer the pulling strain from the contact at 17 to the encircling clamp 19, to prevent breaking the contact in pulling up cable slack.

The particular advantage of the clutch construction shown at 12—14 is that the pressure of the end 14 springs the rod 13 across the diameter of the hole 10 and prevents the rod turning or slipping in the transverse hole 12.

This turning and longitudinal slipping of the rod is a serious disadvantage in all holders I have used in past practical experience. Unlike flame welding, electric welding is done by forming a series of craters or puddles of molten metal spaced along the seam to be welded. This is accomplished by a slight raising and lowering of the end of the rod 13 in the crater. This cannot be accomplished with any degree of skill if the rod 13 is loose enough to slip or turn in the chuck, especially in holders using a set screw to hold the rod. The incidental expansion and contraction of the rod and set screw gradually loosens the rod.

In the present invention the rod can be maintained tight in the chuck by holding the flange 16 and turning up the handle 1, to spring the rod 13 laterally at 12—14 as described, see Figs. 2 and 3.

It also occasionally happens that welds have to be made overhead, at inconvenient angles and in restricted quarters. To meet such conditions the rod can be bent as at 21, and successfully used, because it will not slip or turn in the chuck.

In the act of welding the ends of the rod, as at 22, 23, become enlarged or upset and will not pass through the hole 12. This disadvantage is obviated by the throat 24, leading from the periphery of the head 11 and merging into the diameter of the hole 12. Since the diameter of the body of the rod 13 is not changed in use, it falls easily from the hole 12 and throat 24, when the conductor 3 is backed into the neck 9 to release the clamp 12—14.

Incidental heat generated by the ohmic resistance in the neck (9) of the ordinary holder can be minimized by making the conductor 3 of copper or other metal of high conductive efficiency.

Having thus described this invention what I claim and desire to secure by Letters Patent is:

A welding rod holder including a hollow insulating handle; a conductor fixed in one end of said handle; a neck threaded on said conductor and cooperating therewith to form a rod holding chuck; a dielectric guard on said neck telescoping the adjacent end of said handle; a clamp fixed in the opposite end of said handle adapted to externally engage an insulated cable extending into said handle; and a compression coupling on said conductor within said handle and adapted to engage said cable.

JOE CAMPBELL.